United States Patent [19]
Muramatsu

[11] Patent Number: 5,823,157
[45] Date of Patent: Oct. 20, 1998

[54] CONSTRUCTION OF AN INTAKE PASSAGE HAVING A VARIABLE CROSS-SECTIONAL AREA AND LENGTH FOR AN INTERNAL COMBUSTION ENGINE

[75] Inventor: Hiroaki Muramatsu, Toyota, Japan

[73] Assignee: Toyota Jidosha Kabushiki Kaisha, Aichi-ken, Japan

[21] Appl. No.: 814,223

[22] Filed: Mar. 11, 1997

[30] Foreign Application Priority Data

Mar. 29, 1996 [JP] Japan .................................. 8-077357

[51] Int. Cl.⁶ .................................................. F02B 75/18
[52] U.S. Cl. .............................. 123/184.56; 123/184.53
[58] Field of Search ..................... 123/184.56, 184.21, 123/184.53, 184.55

[56] References Cited

U.S. PATENT DOCUMENTS

| | | | |
|---|---|---|---|
| 4,759,320 | 7/1988 | Fujii et al. | 123/184.56 |
| 4,977,866 | 12/1990 | Wilkins | 123/184.56 |
| 5,009,200 | 4/1991 | Van Basshuysen et al. | 123/184.56 |
| 5,584,270 | 12/1996 | Dohring | 123/184.56 |

FOREIGN PATENT DOCUMENTS

| | | | |
|---|---|---|---|
| 62-13768 | 1/1987 | Japan | 123/184.56 |
| 62-214223 | 9/1987 | Japan . | |
| 63-18134 | 1/1988 | Japan | 123/184.56 |
| 1-253526 | 10/1989 | Japan . | |
| 2-291422 | 12/1990 | Japan | 123/184.56 |

*Primary Examiner*—David A. Okonsky
*Attorney, Agent, or Firm*—Kenyon & Kenyon

[57] ABSTRACT

A construction of an intake passage for an internal combustion engine in which a length of the intake passage is automatically varied in response to a variation in the cross-sectional area of the intake passage. The intake passage is provided for supplying intake air to an intake port of the engine. A first intake pipe has a first end connected to the intake port of the internal combustion engine. A second intake pipe is movably connected to the first intake pipe. The second intake pipe has an open end protruding from a second end of the first intake pipe so as to introduce air therethrough to the first intake pipe. A cross-sectional area of the second intake pipe gradually increases toward the open end. A projection protrudes into an interior of the second intake pipe through the open end.

12 Claims, 4 Drawing Sheets

FIG. 4A
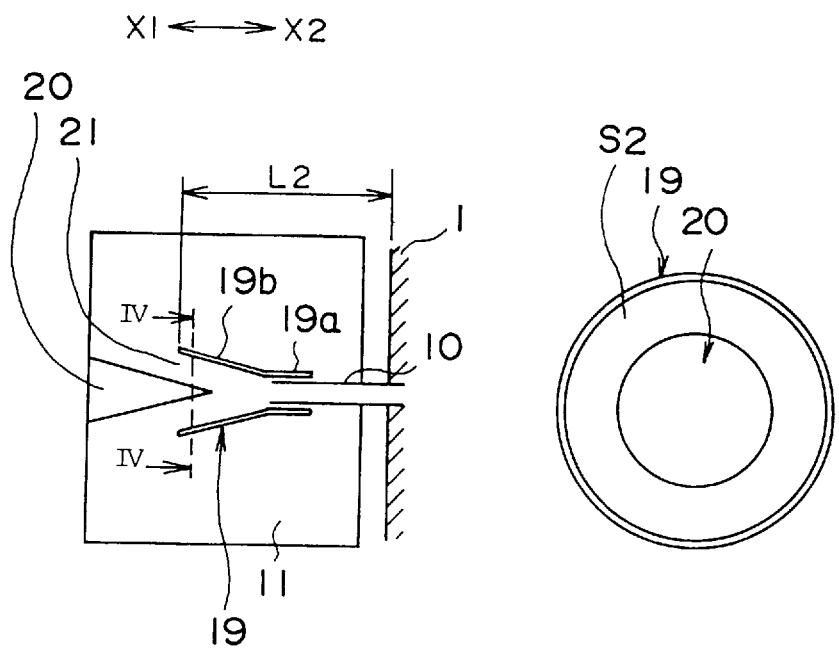
FIG. 4B
FIG. 5
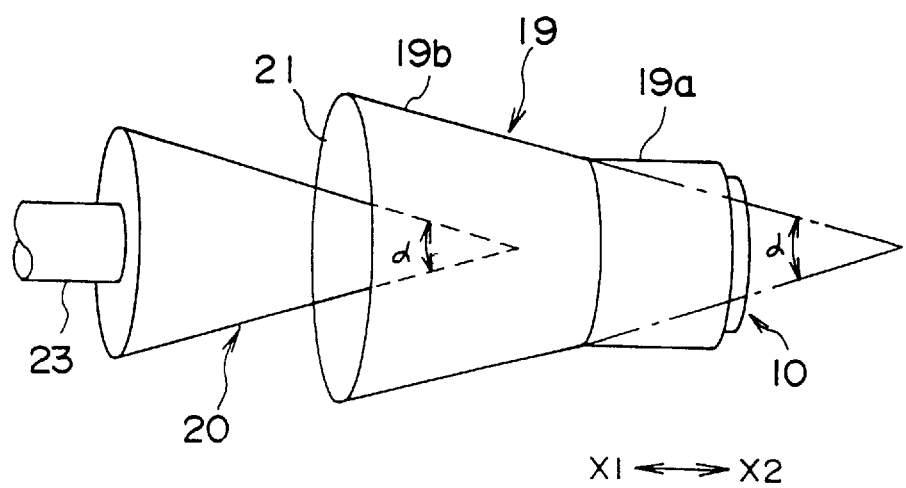

CONSTRUCTION OF AN INTAKE PASSAGE HAVING A VARIABLE CROSS-SECTIONAL AREA AND LENGTH FOR AN INTERNAL COMBUSTION ENGINE

BACKGROUND OF THE INVENTION

1. Field of the Invention

The present invention generally relates to a construction of an intake passage for an internal combustion engine and, more particularly, to a construction of an intake passage having a cross-sectional area which is variable in response to operational conditions of an internal combustion engine.

2. Description of the Related Art

Generally, a revolution speed of an internal combustion engine is variable over a wide range from a low speed to a high speed. Thus, an optimum charge efficiency for intake gas introduced into a combustion chamber must be achieved at various speeds. The charge efficiency tends to decrease especially when the engine is operated with a light load at a low speed. The decrease in the charge efficiency may cause a decrease in combustion efficiency and exhaust efficiency.

In order to improve a charge efficiency for intake gas, a variety of constructions have been suggested for intake passages. One of the constructions is a dual passage construction which has a passage (low speed passage) for a low speed operation and a passage (high speed passage) for a high speed operation. The high speed passage is provided with a valve such as a butterfly valve. In the dual passage construction, the low speed passage has a small cross-sectional area, whereas the high speed passage has a large cross-sectional area. The valve provided to the high speed passage is open when the engine is operated at a high speed, whereas the valve is closed when the engine is operated at a low speed. Thus, when the engine is operated at a high speed, a large amount of intake gas (air or air-gas mixture) flows into an intake port mostly via the high speed passage. This improves a charge efficiency at a high speed operation. On the other hand, when the engine is operated at a low speed, the intake gas mainly flows through the low speed passage having a small cross sectional area. Thus, the flow speed of the intake gas is increased, and thus the charge efficiency is also improved during the low speed operation.

However, there is a problem in that the dual passage construction is complex and requires many parts. Thus, the size of the intake passage is increased and manufacturing cost is also increased.

Japanese Laid-Open Patent Application No. 1-253526 discloses a construction of an intake passage having a variable cross-sectional area. This construction comprises a conical intake passage connected to an intake port of an engine and a conical member situated inside the conical intake passage. The contour of the conical member matches the interior configuration of the conical intake passage. The conical member is movable inside the conical intake passage so that the width of a gap between the conical member and the inner wall of the conical intake passage is variable. That is, the cross-sectional area of the passage defined by the conical intake passage and the conical member is varied. More specifically, when the engine is operated at a high speed, the cross-sectional area of the intake passage is increased by moving the conical member rearwardly so as to increase the charge efficiency. On the other hand, when the engine is operated at a low speed, the cross-sectional area of the intake passage is decreased by moving the conical member forwardly so as to increase flow speed of the intake gas to increase the charge efficiency.

Generally, it is known that an optimum intake passage is achieved by providing a large cross-sectional area with a short passage length for a high speed operation and a small cross-sectional area with a long passage length for a low speed operation. In this respect, the intake passage suggested in the above-mentioned patent document is not sufficient for achieving the optimum intake passage. That is, the above-mentioned intake passage can vary the cross-sectional area but cannot vary the length of the passage.

SUMMARY OF THE INVENTION

It is a general object of the present invention to provide an improved and useful construction of an intake passage for an internal combustion engine in which the above-mentioned problems are eliminated.

A more specific object of the present invention is to provide a construction of an intake passage for an internal combustion engine in which a length of the intake passage is automatically varied in response to a variation in the cross-sectional area of the intake passage.

In order to achieve the above-mentioned objects, there is provided according to the present invention a construction of an intake passage for an internal combustion engine, the intake passage provided for supplying intake air to an intake port of the internal combustion engine, the construction of an intake passage comprising:

a first intake pipe having a first end and a second end, the first end connected to the intake port of the internal combustion engine;

a second intake pipe movably connected to the first intake pipe, the second intake pipe having an open end protruding from the second end of the first intake pipe so as to introduce air therethrough to the first intake pipe, a cross-sectional area of the second intake pipe gradually increasing toward the open end; and a projection protruding into an interior of the second intake pipe through the open end.

According to the above-mentioned invention, since the second intake pipe is slidable along the first intake pipe, the total length of the intake passage can be varied by the movement of the second intake pipe. That is, the total length is increased when the second intake pipe is moved toward the upstream side whereas the total length is decreased when the second intake pipe is moved toward the downstream side.

Additionally, the cross-sectional area of the intake passage is defined by an annular gap formed between an inner wall of the second intake pipe and an outer surface of the projection. Since the second intake pipe has the cross-sectional area which gradually increases toward the open end, the cross-sectional area of the intake passage is decreased as the second intake pipe approaches the projection. On the contrary, the cross-secitional area of the intake passage is increased as the second intake pipe moves away from the projection.

Accordingly, in the present invention, the length of the intake passage is automatically increased when the cross-sectional area of the intake passage is decreased. The length of the intake passage is automatically decreased when the cross-sectional area of the intake passage is increased. Thus, an optimum charge efficiency of the intake air can be achieved in response to operational condition of the internal combustion engine by moving the second intake pipe in the upstream or downstream direction along the first intake pipe.

In the present invention, the second intake pipe may include a first portion slidable along the first intake pipe and a second portion having the open end, a cross-sectional area of the second portion continuously increasing toward the open end.

Additionally, a contour of the projection is similar to an inner contour of the second portion of the second intake pipe.

The inner contour of the second portion of the second intake pipe may be a conical shape, and the contour of the projection may be a conical shape having a top angle the same as a top angle of the conical shape of the second portion of the second intake pipe.

Further, the internal combustion engine may comprise a surge tank for suppressing a pulsation of intake air, and the second intake pipe and the projection may be situated inside the surge tank.

The projection may be fixed on an inner surface of the surge tank.

The construction of an intake passage according to the present invention may further comprise a driving mechanism for moving the second intake pipe in directions along the first intake pipe.

The driving mechanism may move the second intake pipe in response to operational conditions of the internal combustion engine. Additionally, the driving mechanism may comprise an actuator and a connecting member connecting the actuator and the second intake pipe. The actuator may be a hydraulic cylinder. Alternatively, the actuator may be a pneumatic cylinder. Further, the actuator may comprise a pinion gear rotated by a motor and a rack gear engaged with the pinion gear, the rack gear connected to the connecting member.

Other objects, features and advantages of the present invention will become more apparent from the following detailed description when read in conjunction with the accompanying drawings.

BRIEF DESCRIPTION OF THE DRAWINGS

FIG. 4A is an illustration of the slide pipe and the conical projection shown in FIG. 1 when the internal combustion engine is operated at a high speed; FIG. 4B is a cross-sectional view taken along a line IV—IV of FIG. 4A;

FIG. 5 is a perspective view of the slide pipe and the conical projection shown in FIG. 4A;

DETAILED DESCRIPTION OF THE PREFERRED EMBODIMENT

Figure 1:
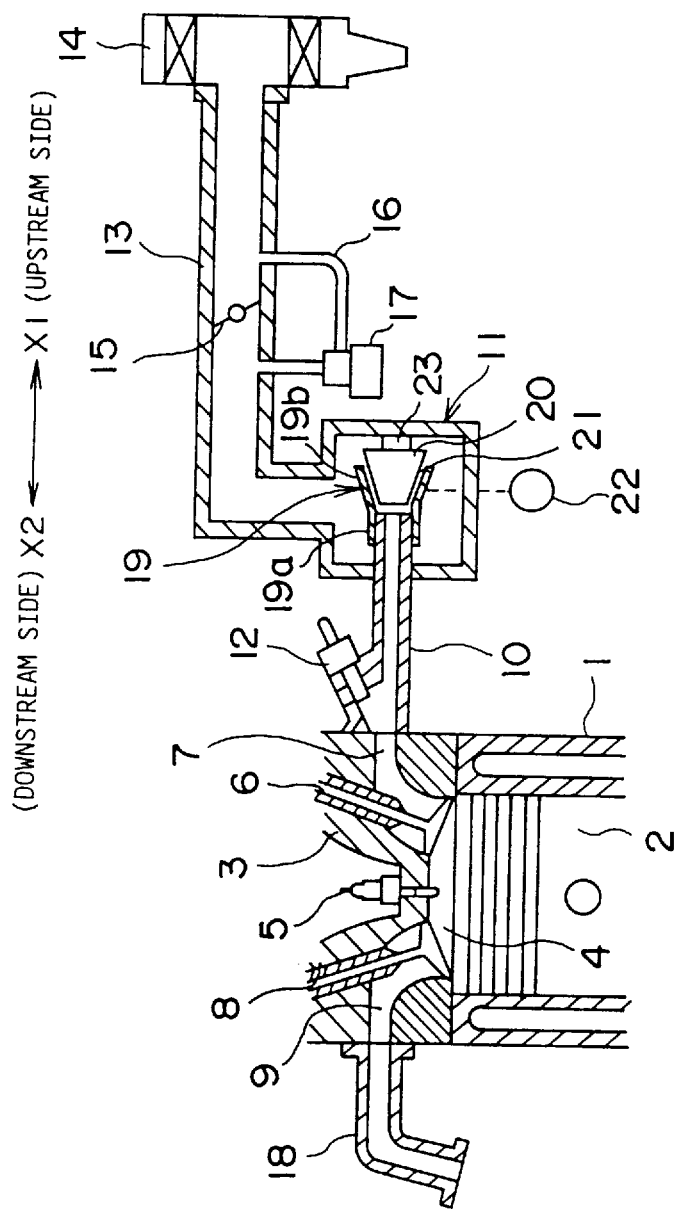
FIG. 1 is an illustration of an internal combustion engine having an intake passage according to an embodiment of the present invention.

A description will now be given of an embodiment of the present invention. FIG. 1 is an illustration of an internal combustion engine having an intake passage according to the embodiment of the present invention. The engine shown in FIG. 1 comprises an engine body 1, a piston 2, a cylinder head 3, a combustion chamber 4 formed between the piston 2 and the cylinder head 3, an ignition plug 5, an intake valve 6, an intake port 7, an exhaust valve 8 and an exhaust port 9.

The intake port 7 is connected to a surge tank 11 via a branch pipe (a first intake passage) 10. A fuel injection valve 12 is provided to the branch pipe 10. The fuel injection valve 12 injects fuel toward the intake port 7. The fuel injection valve 12 is connected to an electronic control unit ECU (not shown in the figure) so that operation of the fuel injection valve 12 is controlled by the ECU.

The surge tank 11 is connected to an air cleaner 14 via an intake duct 13. A throttle valve 15 is provided in the intake duct 13. Thus, an air filtered by the air cleaner 14 flows through the intake duct 13, and flows into the surge tank 11 after the flow is controlled by the throttle valve 15.

A bypass passage 16 is provided to the intake duct 13. The bypass passage 16 is connected to bypass the throttle valve 15 provided inside the intake duct 13. The bypass passage 16 has an idle speed control valve (ISCV) 17 which controls a flow rate of air flowing through the bypass passage 16.

The ISCV 17 is provided to control an idle speed of the engine. That is, the flow rate of air flowing through the bypass passage 16 is controlled so that the idle speed is maintained to be a target speed when the engine is in an idling operation.

Provided inside the surge tank 11 is a slide pipe (a second intake passage) and a conical projection (a conical member) 20. The slide pipe 19 is slidably mounted on an end of the branch pipe 10 inside the surge tank 11. The details of the slide pipe 19, the branch pipe 10 and the conical projection 20 will be described later.

A pulsation of the air flowing from the intake duct 13 into the surge tank 11 is suppressed in the surge tank 11 and, then, the air in the surge tank 11 flows into the branch pipe 10. The air flowing into the branch pipe 10 is mixed with fuel injected by the fuel injection valve 12 to produce an air/fuel mixture gas. The mixture gas flows into the combustion chamber 4 during an intake process of the intake valve 6.

The mixture gas is ignited by the ignition plug 5. The exhaust gas generated by the combustion of the mixture gas is exhausted to an exhaust manifold 18 through the exhaust port 9 during an exhaust process of the exhaust valve 8.

It should be noted that the engine shown in FIG. 1 is provided with an engine speed sensor (not shown in FIG. 1) for sensing revolution speed of the engine. The engine speed sensor detects the revolution speed of the engine based on signals output from a distributor in synchronization with revolutions of an engine crank shaft.

A description will now be given, with reference to FIGS. 2 to 5 in addition to FIG. 1, of a structure of the branch pipe 10, the slide pipe 19 and the conical projection 20. As shown in each figure, the branch pipe 10 is connected to the intake port 7 at an end on the downstream side with respect to the air flow within the branch pipe 10. An opposite end, which is on the upstream side, of the branch pipe 10 protrudes into the surge tank 11. It should be noted that the upstream direction is indicated by an arrow X1, and the downstream direction is indicated by an arrow X2 in the figures.

The slide pipe 19 comprises a cylindrical portion 19a and a conical portion 19b. The cylindrical portion 19a is positioned on the downstream side and the conical portion 19b is positioned on the upstream side. The cylindrical portion 19a is slidably mounted on the end of the branch pipe 10 which end protrudes into the surge tank 11. The conical portion is configured so that the cross-sectional area is gradually increased toward the upstream direction from the cylindrical portion 19a.

Additionally, a driving mechanism 22 is connected to the slide pipe 19 so that the slide pipe 19 is moved along the branch pipe 10 by the driving mechanism 22 in directions X1 and X2. An operation of the driving mechanism 22 is controlled by the ECU. That is, the ECU controls the driving mechanism 22 based on the signal output from the engine speed sensor so as to move the slide pipe 19 in a desired direction.

Figure 3:
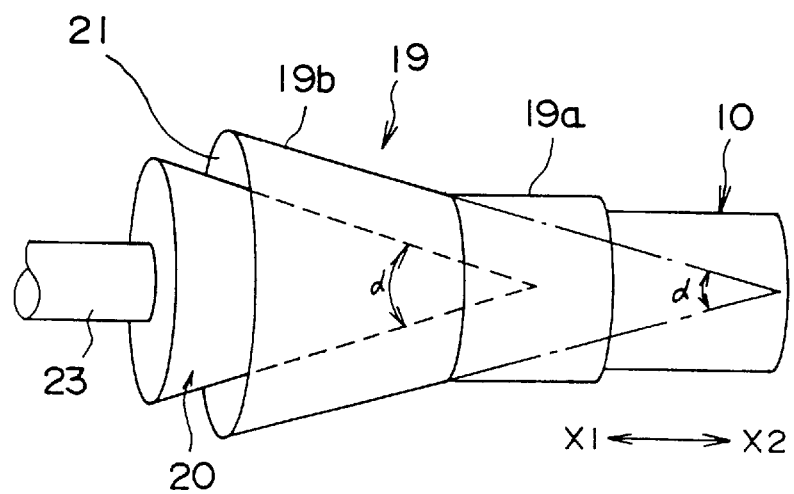
FIG. 3 is a perspective view of the slide pipe and the conical projection shown in FIG. 2A.

On the other hand, the conical projection 20 is fixed to an inner wall of the surge tank 11 by a fixing rod 23. The conical projection 20 is configured to be in a conical shape so that the contour of the conical projection 20 matches the inner configuration of the slide pipe 19. Specifically, when the top angle of the conical portion 19b is equal to a degrees as shown in FIGS. 3 and 5, the top angle of the conical projection 20 is set to a degrees. Additionally, the conical projection 20 is positioned in the conical portion 19b of the slide pipe 19 when the conical projection 20 is fixed to the inner wall of the surge tank 11.

Accordingly, in the above-mentioned construction, the slide pipe 19 is movable in the X1 direction or the X2 direction between the branch pipe 10 and the conical projection 20 both of which are fixed to the surge tank 11.

A description will now be given of a construction of the above-mentioned intake passage.

Figure 2A:
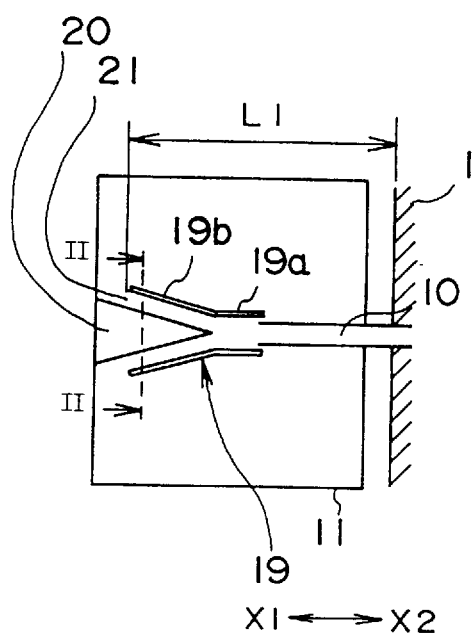
FIG. 2A is an illustration of a slide pipe and a conical projection shown in FIG. 1 when the internal combustion engine is operated at a low speed.
Figure 2B:
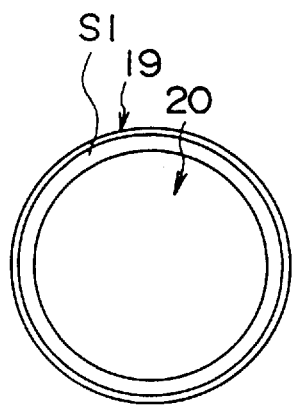
FIG. 2B is a cross-sectional view taken along a line II—II of FIG. 2A.

FIGS. 2A, 2B and 3 show a positional relationship between the slide pipe 19 and the conical projection 20 when the engine is operated at a low speed. When the ECU determines that the engine is operated at a low speed based on the signal output by the engine revolution sensor, the ECU moves the slide pipe 19 toward the upstream direction (X1 direction) via the driving mechanism 22. That is, when the engine is operated at a low speed, the slide pipe 19 is moved closer to the conical projection 20. Accordingly, in this state, the conical projection 20 enters further into the slide pipe 19.

On the other hand, FIGS. 4A, 4B and 5 show a positional relationship between the slide pipe 19 and the conical projection 20 when the engine is operated at a high speed. When the ECU determines that the engine is operated at a high speed based on the signal output by the engine revolution sensor, the ECU moves the slide pipe 19 toward the downstream direction (X2 direction) via the driving mechanism 22. That is, when the engine is operated at a high speed, the slide pipe 19 is moved closer to the branch pipe 10. Accordingly, in this state, the branch pipe 10 enters further into the slide pipe 19.

A description will now be given of a length of the intake passage and a cross-sectional area of the intake passage when the engine is operated at a low speed and at a high speed. Here, the length of the intake passage refers to a length from the intake port 7 to the upstream end 21 of the slide pipe 19. The cross-sectional area of the intake passage refers to the cross sectional area of a gap formed between the inner wall of the slide pipe 19 and the outer wall of the conical projection 20.

With respect to the length of the intake passage, since the slide pipe 19 is moved closer to the conical projection 20 as shown in FIGS. 2A, 2B and 3 when the engine is operated at a low speed, the overlapping portion between the slide pipe 19 and the branch pipe 10 is short whereas the overlapping portion between the slide pipe 19 and the conical projection 20 is long. Accordingly, the length of the intake passage is long as specifically indicated by an arrow L1 in FIG. 2A.

On the other hand, since the slide pipe 19 is moved closer to the branch pipe 10 as shown in FIGS. 4A, 4B and 5 when the engine is operated at a high speed, the overlapping portion between the slide pipe 19 and the branch pipe 10 is long whereas the overlapping portion between the slide pipe 19 and the conical projection 20 is short. Accordingly, the length of the intake passage is shorter than that in the low speed state as specifically indicated by an arrow L2 in FIG. 4A (L1>L2).

With respect to the cross-sectional area of the intake passage, the cross-sectional area S of the annular gap formed between the slide pipe 19 and the conical projection 20 varies as the slide pipe 19 moves along the branch pipe 10 since both the slide pipe 19 and the conical projection 20 have a conical shape in which the cross-sectional area gradually increases toward the upstream direction. That is, since the conical projection 20 enters further into the slide pipe 19 when the slide pipe 19 is moved in the upstream direction during the low speed state, the width of the gap formed between the slide pipe 19 and the conical projection 20 is decreased. Thus, the cross-sectional area of the intake passage is decreased as indicated by a cross-sectional area S1 in FIG. 2B. On the other hand, since the conical projection 20 moves away from the slide pipe 19 when the slide pipe 19 is moved in the downstream direction during the high speed state, the width of the gap formed between the slide pipe 19 and the conical projection 20 is increased. Thus, the cross-sectional area of the intake passage is increased as indicated by a cross-sectional area S2 in FIG. 4B.

According to the above-mentioned construction of the intake passage, the length of the intake passage is increased and the cross-sectional area of the intake passage is decreased due to the movement of the slide pipe toward the upstream direction during the low speed state whereas the length of the intake passage is decreased and the cross-sectional area of the intake passage is increased due to the movement of the slide pipe toward the downstream direction during the high speed state. As previously mentioned, in order to achieve an optimum charge efficiency, it is desired to increase the cross-sectional area of the intake passage and decrease the length of the intake passage when the engine is operated at a high speed whereas it is desired to decrease the cross-sectional area of the intake passage and increase the length of the intake passage when the engine is operated at a low speed. Accordingly, the construction of the intake passage according to the present embodiment satisfies the above-mentioned condition, and, thus, an optimum charge efficiency can be achieved in response to the operational conditions of the engine.

Additionally, in the present embodiment, the slide pipe 19 can be continuously moved from the position indicated in FIGS. 2A, 2B and 3 to the position indicated in FIGS. 4A, 4B and 5. Thus, the length and the cross-sectional area of the intake passage can be continuously varied from the low speed position to the high speed position. That is, for example, the length and the cross-seciotnal area of the intake passage can be set to an intermediate position between the low speed position and the high speed position so as to achieve an optimum charge efficiency when the engine is operated at a medium speed between the low speed and the high speed.

Figure 6A:
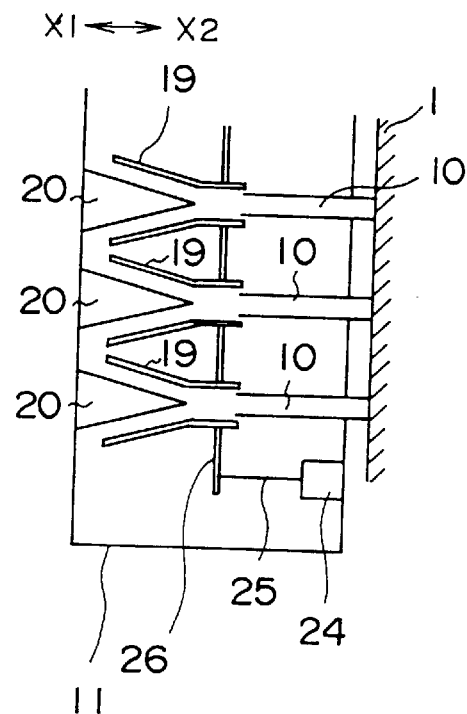
FIG. 6A is an illustration showing an example of a driving mechanism for moving the slide pipe.
Figure 6B:
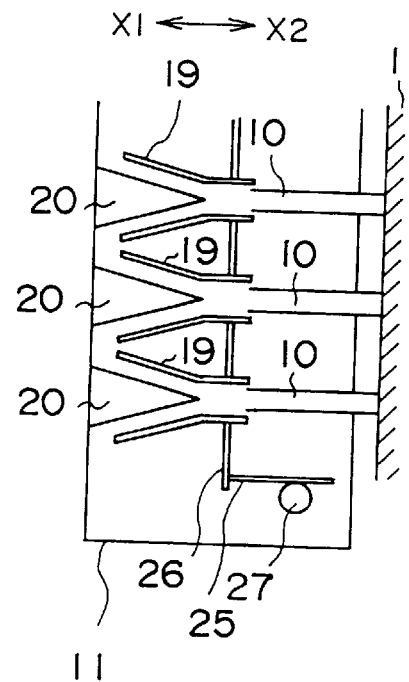
FIG. 6B is an illustration showing another example of the driving mechanism.

FIGS. 6A and 6B show examples of the construction of the driving mechanism 22 which can achieve the continuous variation of the position of the slide pipe 19. In FIGS. 6A and 6B, parts that are the same as the parts shown in FIGS. 1 to 5 are given the same reference numerals, and descriptions thereof will be omitted.

In the example shown in FIG. 6A, an actuator 24 is used for the driving mechanism 22. The actuator 24 may be a hydraulic cylinder which moves a drive arm 25 in the X1 or X2 direction in response to an amount of fluid supplied thereto. The drive arm 25 is connected to a connecting arm 26 to which a plurality of slide arms 19 are connected. Accordingly, the slide arms 19 can be moved continuously in the upstream direction (X1 direction) or the downstream direction (X2 direction) via the drive arm 25 and the connecting arm 26 by controlling the amount of fluid supplied to the actuator 24. It should be noted that the actuator 24 is not limited to the hydraulic cylinder, and other actuators such as a pneumatic cylinder or a solenoid may be used.

In the example shown in FIG. 6B, a motor 27 is used for the driving mechanism 22. A shaft of the motor 27 is provided with a pinion gear (not shown in the figures) and a drive arm is provided with a rack gear (not shown in the figures). In this construction, the slide pipes 19 can be moved continuously in the upstream direction (X1 direction) or the downstream direction (X2 direction) via the drive arm 25 and the connecting arm 26 by operating the motor 27.

Figure 7A:
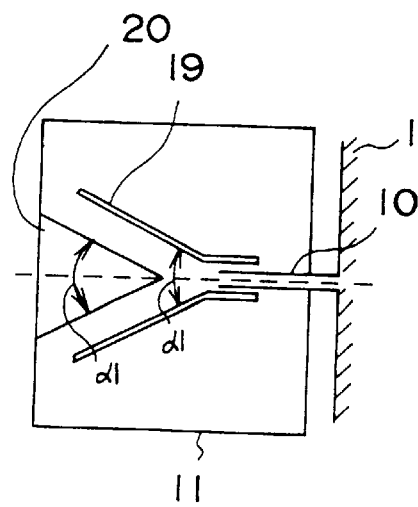
FIGS. 7A and 7B are illustrations for explaining adjustment of the cross-sectional area of the intake passage.
Figure 7B:
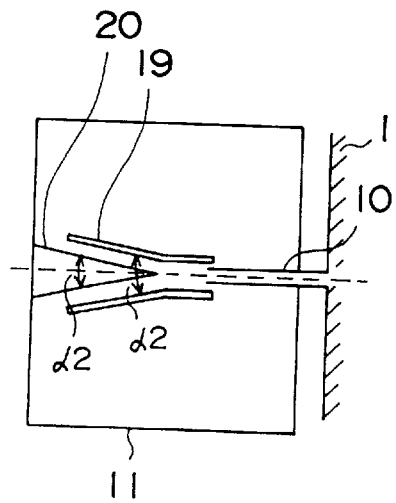

FIGS. 7A and 7B are illustrations for explaining adjustment of the cross-sectional area of the intake passage. There may be a case, depending on types of engines, in which a large change in the cross-sectional area of the intake passage is required for a small movement of the slide pipe 19. On the contrary, there may be a case in which a small change in the cross-sectional area of the intake passage is required for a large movement of the slide pipe 19. In such a case, the top angle of each of the slide pipe 19 and the conical projection 20 may be changed to obtain a desired change ratio of the cross-sectional area per unit length of the movement of the slide pipe 19.

Specifically, a large change ratio of the cross-sectional area of the intake passage can be achieved by increasing the top angle of each of the slide pipe 19 and the conical projection 20 to an angle $\alpha 1$ as shown in FIG. 7A. On the other hand, a small change ratio can be achieved by decreasing the top angle to an angle $\alpha 2$ as shown in FIG. 7B. Accordingly, an optimum construction of the intake passage can be easily achieved by selecting an appropriate value for the top angle of the slide pipe 19 and the conical projection 20 in response to various engine characteristics.

In the above-mentioned embodiment, the slide pipe 19 and the conical projection 20 has a conical shape. However, the shape of the slid pipe 19 and the conical projection 20 is not limited to the conical shape, and other shapes having a cross-sectional area gradually changing from the upstream side to the downstream side. For example, a triangular pyramid may be used instead of conical shape of the slide pipe 19 and the conical projection 20.

The present invention is not limited to the specifically disclosed embodiments, and variations and modifications may be made without departing from the scope of the present invention.

What is claimed is:

1. A construction of an intake passage for an internal combustion engine, said intake passage provided for supplying intake air to an intake port of said internal combustion engine, said construction of an intake passage comprising:
   a first intake pipe having a first end and a second end, said first end connected to said intake port of said internal combustion engine;
   a second intake pipe movably connected to said first intake pipe, said second intake pipe having an open end protruding from said second end of said first intake pipe so as to introduce air therethrough to said first intake pipe, a cross-sectional area of said second intake pipe gradually increasing toward said open end; and
   a projection protruding into an interior of said second intake pipe through said open end.

2. The construction of an intake passage as claimed in claim 1, wherein said second intake pipe includes a first portion slidable along said first intake pipe and a second portion having said open end, a cross-sectional area of said second portion continuously increasing toward said open end.

3. The construction of an intake passage as claimed in claim 2, wherein a contour of said projection is similar to an inner contour of said second portion of said second intake pipe.

4. The construction of an intake passage as claimed in claim 2, wherein said inner contour of said second portion of said second intake pipe is a conical shape, and said contour of said projection is a conical shape having a top angle the same as a top angle of said conical shape of said second portion of said second intake pipe.

5. The construction of an intake passage as claimed in claim 1, wherein said internal combustion engine comprises a surge tank for suppressing a pulsation of intake air, and said second intake pipe and said projection are situated inside said surge tank.

6. The construction of an intake passage as claimed in claim 5, wherein said projection is fixed on an inner surface of said surge tank.

7. The construction of an intake passage as claimed in claim 1, further comprising a driving mechanism for moving said second intake pipe in directions along said first intake pipe.

8. The construction of an intake passage as claimed in claim 7, wherein said driving mechanism moves said second intake pipe in response to operational conditions of said internal combustion engine.

9. The construction of an intake passage as claimed in claim 7, wherein said driving mechanism comprises an actuator and a connecting member connecting said actuator and said second intake pipe.

10. The construction of an intake passage as claimed in claim 9, wherein said actuator is a hydraulic cylinder.

11. The construction of an intake passage as claimed in claim 9, wherein said actuator is a pneumatic cylinder.

12. The construction of an intake passage as claimed in claim 9, wherein said actuator comprises a pinion gear rotated by a motor and a rack gear engaged with said pinion gear, said rack gear connected to said connecting member.

* * * * *